US012651591B2

(12) United States Patent
Biadsy et al.

(10) Patent No.: US 12,651,591 B2

(45) Date of Patent: Jun. 9, 2026

(54) STREAMING SPEECH-TO-SPEECH MODEL WITH AUTOMATIC SPEAKER TURN DETECTION

(71) Applicant: Google LLC, Mountain View, CA (US)

(72) Inventors: Fadi Biadsy, Mountain View, CA (US); Oleg Rybakov, Mountain View, CA (US)

(73) Assignee: Google LLC, Mountain View, CA (US)

( * ) Notice: Subject to any disclaimer, the term of this patent is extended or adjusted under 35 U.S.C. 154(b) by 330 days.

(21) Appl. No.: 18/319,410

(22) Filed: May 17, 2023

(65) Prior Publication Data

US 2023/0395061 A1     Dec. 7, 2023

Related U.S. Application Data

(60) Provisional application No. 63/365,796, filed on Jun. 3, 2022.

(51) Int. Cl.
    *G10L 13/047*       (2013.01)
    *G10L 15/04*        (2013.01)
    (Continued)

(52) U.S. Cl.
    CPC ............ *G10L 13/047* (2013.01); *G10L 15/04* (2013.01); *G10L 15/16* (2013.01); *G10L 15/30* (2013.01)

(58) Field of Classification Search
    CPC ....... G10L 13/00; G10L 13/047; G10L 15/04; G10L 15/16; G10L 13/10; G10L 15/063;
    (Continued)

(56) References Cited

U.S. PATENT DOCUMENTS 8,301,436 B2 *   10/2012   Wang ...................... G10L 15/22
                                                704/251
  10,186,254 B2 *   1/2019   Williams ................ G10L 15/04
                         (Continued)

FOREIGN PATENT DOCUMENTS

JP         2018132678 A      8/2018
WO       2022046526 A1     3/2022

OTHER PUBLICATIONS

P.J. Dix—A breakpoint analysis procedure based on temporal decomposition—Published in: IEEE Transactions on Speech and Audio Processing ( vol. 2, Issue: 1, Jan. 1994) (Year: 2019).*

(Continued)

*Primary Examiner* — Abdelali Serrou
(74) *Attorney, Agent, or Firm* — Honigman LLP; Brett A. Krueger; Grant Griffith

(57)               ABSTRACT

A method for turn detection in a speech-to-speech model includes receiving, as input to the speech-to-speech (S2S) model, a sequence of acoustic frames corresponding to an utterance. The method further includes, at each of a plurality of output steps, generating, by an audio encoder of the S2S model, a higher order feature representation for a corresponding acoustic frame in the sequence of acoustic frames, and determining, by a turn detector of the S2S model, based on the higher order feature representation generated by the audio encoder at the corresponding output step, whether the utterance is at a breakpoint at the corresponding output step. When the turn detector determines that the utterance is at the breakpoint, the method includes synthesizing a sequence of output audio frames output by a speech decoder of the S2S model into a time-domain audio waveform of synthesized speech representing the utterance spoken by the user.

30 Claims, 5 Drawing Sheets

(51) Int. Cl.

| | | |
|---|---|---|
| *G10L 15/16* | (2006.01) | |
| *G10L 15/30* | (2013.01) | |

(58) Field of Classification Search

CPC ......... G10L 13/08; G10L 13/02; G10L 15/26; G10L 15/22; G10L 21/003; G10L 25/18; G10L 25/30; G10L 19/16; G10L 13/033; G10L 15/197; G10L 2021/0575; G10L 21/057; G10L 13/027; G10L 2015/0635; G10L 13/04; G10L 15/07; G10L 21/04; G10L 21/10; G10L 25/66; G10L 15/02; G10L 15/30; G10L 19/038; G10L 2019/0001; G10L 25/78; G10L 15/01; G10L 15/083; G10L 17/04; G10L 17/06; G10L 17/18; G10L 19/00; G10L 2015/025; G10L 2021/0135; G10L 21/00; G10L 21/007; G10L 25/51; G10L 15/06; G10L 15/18; G10L 15/1815; G10L 15/183; G10L 15/19; G10L 15/25; G10L 21/0364; G10L 25/57; G10L 25/93; G10L 25/90; G10L 15/005; G10L 15/32; G06F 40/58; G06F 18/214; G06F 40/42; G06F 40/30; G06F 40/45; G06F 40/47; G06F 16/24522; G06F 16/3337; G06F 18/24; G06F 40/211; G06F 40/263; G06F 40/279; G06F 40/51; G06F 40/56

See application file for complete search history.

(56) References Cited

U.S. PATENT DOCUMENTS

| | | | | |
|---|---|---|---|---|
| 2006/0253272 | A1* | 11/2006 | Gao | G10L 13/00 |
| | | | | 704/E13.008 |
| 2008/0243476 | A1* | 10/2008 | Gao | G10L 13/00 |
| | | | | 704/E13.008 |
| 2011/0197206 | A1* | 8/2011 | Deshmukh | G06Q 10/06 |
| | | | | 719/317 |
| 2020/0219517 | A1* | 7/2020 | Wang | G10L 17/00 |
| 2020/0226327 | A1* | 7/2020 | Matusov | G06F 18/214 |
| 2023/0352001 | A1* | 11/2023 | Carmiel | G10L 13/10 |

OTHER PUBLICATIONS

International Search Report and Written Opinion for the related Application No. PCT/US2023/022612, dated Aug. 11, 2023, 32 pages.

Podo, Mikolaj et al: "Improved weighted loss function for training end-of-speech detection models", 9th International Conference on Software Development and Technologies for Enhancing Accessibility and Fighting Info-Exclusion, ACM PUB27 , New York, NY, USA, Nov. 30, 2020 (Nov. 30, 2020), pp. 25-29, XP058885385, DOI: 10.1145/3428690. 3429160 ISBN: 978-1-4503-9018-7 abstract Section 3, 4 pages.

Japanese Office Action for the related Application No. 2024-567521 dated Jul. 15, 2025.

* cited by examiner

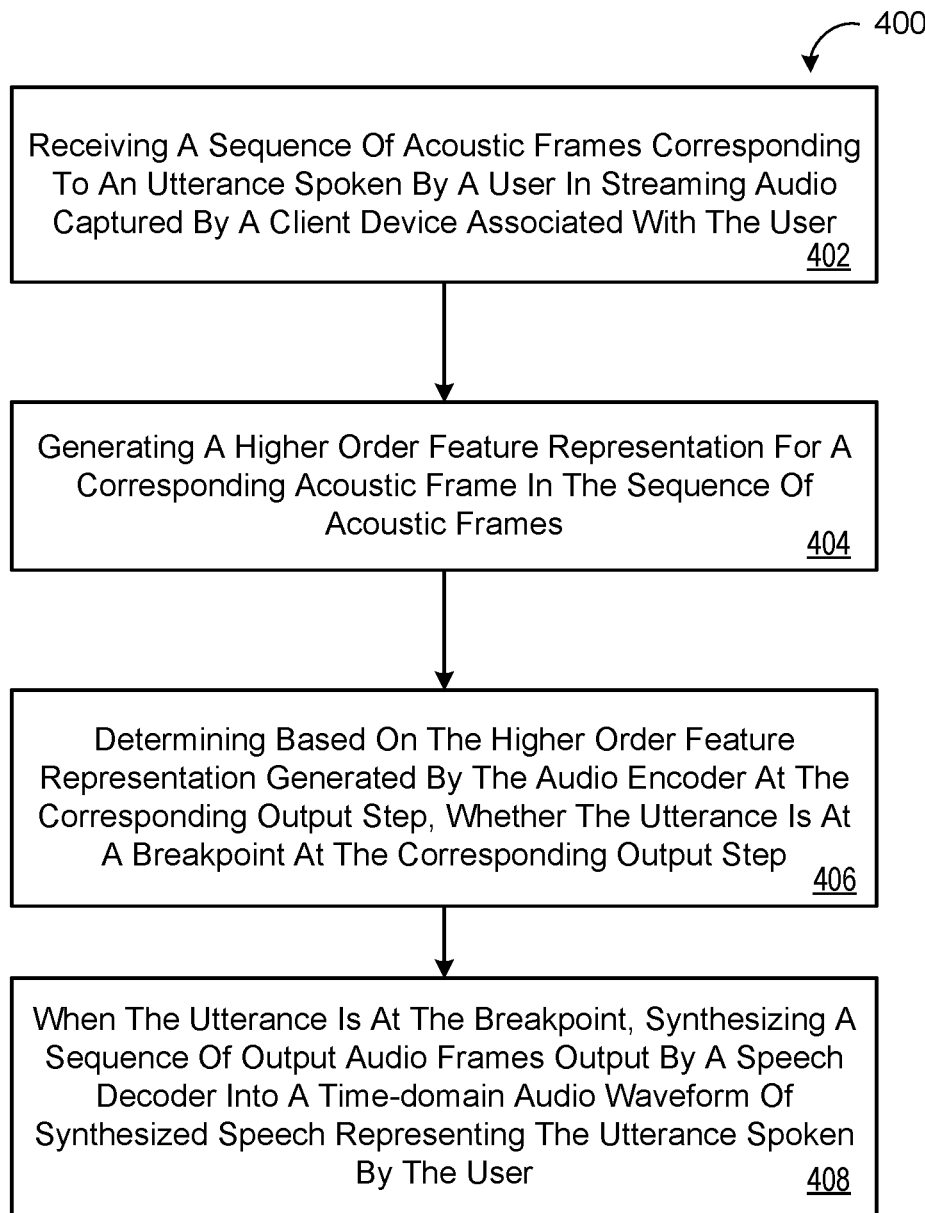

400

Receiving A Sequence Of Acoustic Frames Corresponding To An Utterance Spoken By A User In Streaming Audio Captured By A Client Device Associated With The User
402

Generating A Higher Order Feature Representation For A Corresponding Acoustic Frame In The Sequence Of Acoustic Frames
404

Determining Based On The Higher Order Feature Representation Generated By The Audio Encoder At The Corresponding Output Step, Whether The Utterance Is At A Breakpoint At The Corresponding Output Step
406

When The Utterance Is At The Breakpoint, Synthesizing A Sequence Of Output Audio Frames Output By A Speech Decoder Into A Time-domain Audio Waveform Of Synthesized Speech Representing The Utterance Spoken By The User
408

FIG. 4

STREAMING SPEECH-TO-SPEECH MODEL WITH AUTOMATIC SPEAKER TURN DETECTION

CROSS REFERENCE TO RELATED APPLICATIONS

This U.S. patent application claims priority under 35 U.S.C. § 119(e) to U.S. Provisional Application 63/365,796, filed on Jun. 3, 2022. The disclosure of this prior application is considered part of the disclosure of this application and is hereby incorporated by reference in its entirety.

TECHNICAL FIELD

This disclosure relates to a speech-to-speech model including a turn detector.

BACKGROUND

Speech-to-speech (S2S) models can be used to convert the speech of a source speaker into synthesized speech without changing the linguistic information of the original speech. For example, a S2S model can produce canonical fluent synthesized speech for a user with dysarthric or atypical speech. Alternatively, a S2S model can translate a user's speech into synthesized speech in another language. Typically, an S2S model is manually activated by user inputs indicating when the input speech begins and ends. After the user is finished speaking, S2S model then processes the input speech to produce synthesized speech.

SUMMARY

One aspect of the disclosure provides a computer-implemented method that when executed on data processing hardware causes the data processing hardware to perform operations that include receiving, as input to a speech-to-speech (S2S) model, a sequence of acoustic frames corresponding to an utterance spoken by a user in streaming audio captured by a client device associated with the user. At each of a plurality of output steps, the operations also include: generating, by an audio encoder of the S2S model, a higher order feature representation for a corresponding acoustic frame in the sequence of acoustic frames; determining, by a turn detector of the S2S model, based on the higher order feature representation generated by the audio encoder at the corresponding output step, whether the utterance is at a breakpoint at the corresponding output step; and when the turn detector determines that the utterance is at the breakpoint, synthesizing a sequence of output audio frames output by a speech decoder of the S2S model into a time-domain audio waveform of synthesized speech representing the utterance spoken by the user. Here, each output audio frame in the sequence of output audio frames is based on a corresponding one of the higher order feature representations generated by the audio encoder until the corresponding output step when the turn detector determines the utterance is at the breakpoint.

Implementations of the disclosure may include one or more of the following optional features. In some implementations, the operations further include, when the utterance is at the breakpoint, providing for output from the client device: a speaker turn indication that informs the user to stop speaking; and the time-domain audio waveform of synthesized speech representing the utterance spoken by the user. The utterance spoken by the user in the streaming audio captured by the client device may be associated with atypical speech, while the time-domain audio waveform of synthesized speech representing the utterance may include a time-domain audio waveform of synthesized canonical fluent speech of the same utterance spoken by the user. Additionally, the utterance spoken by the user in the streaming audio captured by the client device may be in a first language, while the time-domain audio waveform of synthesized speech representing the utterance may include a time-domain audio waveform of synthesized translated speech of the same utterance in a second language different than the first language In some examples, determining whether the utterance is at the breakpoint at the corresponding output step is further based on one or more of the higher order feature representations generated by the audio encoder at output steps preceding the corresponding output step. Additionally or alternatively, the operations may further include, at each of the plurality of output steps, generating, by the speech decoder of the S2S model, an output audio frame for a corresponding higher order feature representation generated by the audio encoder at the corresponding output step.

In some implementations, the operations also include, in response to determining that the utterance is at the breakpoint at the corresponding output step: receiving, as input to the speech decoder of the S2S model, a sequence of higher order feature representations generated by the audio encoder until the corresponding output step; and generating, by the speech decoder of the S2S model, the sequence of output audio frames. The turn detector may include a deep neural network that may be disposed between the audio encoder and the speech decoder.

In some additional implementations, determining whether the utterance is at the breakpoint at the corresponding output step includes generating, as output from the turn detector, a turn output indicative of whether the utterance is at the breakpoint. Here, the turn output includes a bit or a probability distribution.

In some examples, the operations further include training the S2S model by receiving a set of training utterances, whereby each training utterance in the set of training utterances includes a corresponding sequence of training acoustic frames and is paired with a corresponding ground-truth synthesized speech representation of the training utterance. Each training acoustic frame in the sequence of training acoustic frames is annotated with a label indicating whether the corresponding training acoustic frame corresponds to a breakpoint frame or a non-breakpoint frame. In these examples, the S2S model is further trained by obtaining a first label for the training input audio data indicative of a target output spectrogram, obtaining a second label for the training input audio data indicative of a target turn output, and generating, using the speech conversion model and the training input audio data, a training output that includes: a training output spectrogram corresponding to a synthesized speech representation of the training input audio data; and a training turn output indicative of a breakpoint in the training input audio data. Finally, the S2S model is trained by determining a first loss by comparing the training output spectrogram to the first label; determining a second loss by comparing the training turn output to the second label; and optimizing the speech conversion model based on the first loss and the second loss associated with the training input audio data.

In some implementations, the operations also include determining a speech type of the utterance spoken by the user captured in the streaming audio by the client device;

and selecting, from among a plurality of available speech decoders, the speech decoder for generating the sequence of output audio frames. In some examples, each output audio frame in the sequence of output audio frames output by the speech decoder includes a spectrogram frame.

Another aspect of the disclosure provides a system that includes data processing hardware and memory hardware in communication with the data processing hardware. The memory stores instructions, that when executed on the data processing hardware causes the data processing hardware to perform operations that include receiving, as input to a speech-to-speech (S2S) model, a sequence of acoustic frames corresponding to an utterance spoken by a user in streaming audio captured by a client device associated with the user. At each of a plurality of output steps, the operations also include: generating, by an audio encoder of the S2S model, a higher order feature representation for a corresponding acoustic frame in the sequence of acoustic frames; determining, by a turn detector of the S2S model, based on the higher order feature representation generated by the audio encoder at the corresponding output step, whether the utterance is at a breakpoint at the corresponding output step; and when the turn detector determines that the utterance is at the breakpoint, synthesizing a sequence of output audio frames output by a speech decoder of the S2S model into a time-domain audio waveform of synthesized speech representing the utterance spoken by the user. Here, each output audio frame in the sequence of output audio frames is based on a corresponding one of the higher order feature representations generated by the audio encoder until the corresponding output step when the turn detector determines the utterance is at the breakpoint.

This aspect may include one or more of the following optional features. In some implementations, the operations further include, when the utterance is at the breakpoint, providing for output from the client device: a speaker turn indication that informs the user to stop speaking; and the time-domain audio waveform of synthesized speech representing the utterance spoken by the user. The utterance spoken by the user in the streaming audio captured by the client device may be associated with atypical speech, while the time-domain audio waveform of synthesized speech representing the utterance may include a time-domain audio waveform of synthesized canonical fluent speech of the same utterance spoken by the user. Additionally, the utterance spoken by the user in the streaming audio captured by the client device may be in a first language, while the time-domain audio waveform of synthesized speech representing the utterance may include a time-domain audio waveform of synthesized translated speech of the same utterance in a second language different than the first language In some examples, determining whether the utterance is at the breakpoint at the corresponding output step is further based on one or more of the higher order feature representations generated by the audio encoder at output steps preceding the corresponding output step. Additionally or alternatively, the operations may further include, at each of the plurality of output steps, generating, by the speech decoder of the S2S model, an output audio frame for a corresponding higher order feature representation generated by the audio encoder at the corresponding output step.

In some implementations, the operations also include, in response to determining that the utterance is at the breakpoint at the corresponding output step: receiving, as input to the speech decoder of the S2S model, a sequence of the higher order feature representations generated by the audio encoder until the corresponding output step; and generating, by the speech decoder of the S2S model, the sequence of output audio frames. The turn detector may include a deep neural network that may be disposed between the audio encoder and the speech decoder.

In some additional implementations, determining whether the utterance is at the breakpoint at the corresponding output step includes generating, as output from the turn detector, a turn output indicative of whether the utterance is at the breakpoint. Here, the turn output includes a bit or a probability distribution.

In some examples, the operations further include training the S2S model by receiving a set of training utterances, whereby each training utterance in the set of training utterances includes a corresponding sequence of training acoustic frames and is paired with a corresponding ground-truth synthesized speech representation of the training utterance. Each training acoustic frame in the sequence of training acoustic frames is annotated with a label indicating whether the corresponding training acoustic frame corresponds to a breakpoint frame or a non-breakpoint frame. In these examples, the S2S model is further trained by obtaining a first label for the training input audio data indicative of a target output spectrogram, obtaining a second label for the training input audio data indicative of a target turn output, and generating, using the speech conversion model and the training input audio data, a training output that includes: a training output spectrogram corresponding to a synthesized speech representation of the training input audio data; and a training turn output indicative of a breakpoint in the training input audio data. Finally, the S2S model is trained by determining a first loss by comparing the training output spectrogram to the first label; determining a second loss by comparing the training turn output to the second label; and optimizing the speech conversion model based on the first loss and the second loss associated with the training input audio data.

In some implementations, the operations also include determining a speech type of the utterance spoken by the user captured in the streaming audio by the client device; and selecting, from among a plurality of available speech decoders, the speech decoder for generating the sequence of output audio frames. In some examples, each output audio frame in the sequence of output audio frames output by the speech decoder includes a spectrogram frame.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of an example arrangement of operations for a method of performing speech-to-speech conversion with a turn detector.

Like reference symbols in the various drawings indicate like elements.

DETAILED DESCRIPTION

Figure 1:
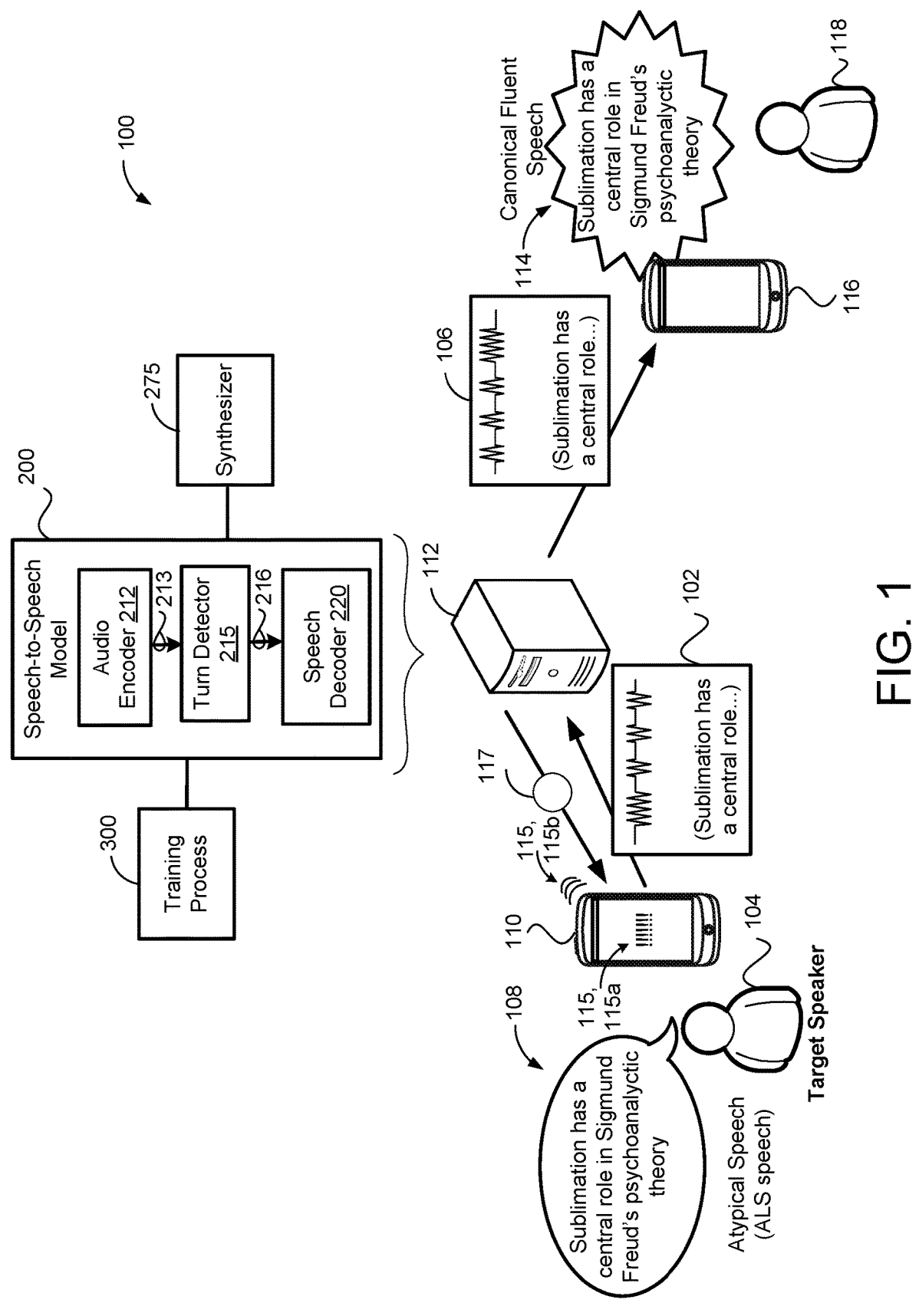
FIG. 1 is a schematic view of an example speech-to-speech system with a turn detector.

There is growing interest to develop more inclusive speech technologies, particularly those that can help people with speech impairments. Speech-to-speech (S2S) conversion has made tremendous strides with the introduction of end-to-end (E2E) deep learning-based models to recognize speech from speakers with dysarthric or atypical speech patterns for conversion into synthesized speech. For instance, atypical speech patterns may include, without limitation, impaired speech due to physical or neurological conditions (e.g., speakers with Amyotrophic Lateral Sclerosis (ALS) disease), heavily-accented speech, and deaf speech. Another use for S2S models is translation, where a user speaks in a first language and the S2S model generates synthesized speech in a second language.

Conventional S2S models require the entire input speech (i.e., utterance) to be received before generating synthesized speech. Typically, a user provides an input indicating the beginning and ending of an utterance for the S2S model. For example, a user may hold down a button on a user interface corresponding to the S2S model when they begin speaking (i.e., begin providing input speech for the S2S model). The user then releases the button when they have finished speaking. The S2S model then converts the input speech that was received during the time that the user was holding down the button into synthesized speech. Such manual methods for activating S2S models can be inconvenient for the user due to the requirement of numerous user inputs. Further, requiring user inputs allows for human errors (e.g., a user may release the button before they complete the utterance).

The present disclosure introduces a turn detector that automatically determines an appropriate breakpoint in the user's speech at which to output synthesized speech converted from the user's speech by a S2S model in a streaming fashion. Thus, instead of requiring a user input to indicate when the utterance begins/ends, the current disclosure can receive streaming speech from a user and automatically determine an appropriate moment in the speech, a so-called "breakpoint," for the user to pause and receive/listen to the synthesized speech produced by the S2S model. By automatically determining the breakpoints, the implementations of the present disclosure provide for a more natural user-experience as the turn-by-turn nature of the system mimics a normal conversation (i.e., the user speaks for a turn and then the system speaks for a turn, and so on).

As used herein, and unless specified otherwise, the terms "speech-to-speech system" and "speech-to-speech model" can refer to any system/model in which the input speech is directly converted into synthesized speech without performing intermediary speech recognition on the input speech. Stated differently, the speech-to-speech system/model is configured to convert an input audio waveform, sequence of acoustic frames, or spectrograms corresponding to the input speech directly into an output audio waveform or spectrograms corresponding to the synthesized speech without converting the input audio waveform into an intermediate representation (e.g., text or phonemes). As will become apparent, speech-to-speech models, as well as techniques for training speech-to-speech models, will enable a user with atypical speech to speak to, and be understood by, both other humans and speech interfaces (e.g., digital assistants) by enabling recognition and/or reproduction of the user's intended speech.

While examples herein depict a speech-to-speech model receiving an input utterance corresponding to atypical speech for conversion into synthesized speech corresponding to canonical fluent speech, the speech-to-speech model can similarly be adapted to perform other types of voice conversion tasks without departing from the scope of the present disclosure. For instance, the S2S model may convert an input utterance in a first language into synthesized speech corresponding to a translation of the input utterance in a different second language. The S2S model may similarly receive spoken inputs by a user and output synthesized speech that contains the same linguistic content of the spoken inputs but with different voice characteristics of a target speaker.

FIG. 1 illustrates a speech-to-speech system 100 that includes a speech-to-speech (S2S) model 200 configured to convert input audio data 102 (e.g., a sequence of acoustic frames or input audio waveform) corresponding to an utterance 108 spoken by a target speaker 104 directly into output audio data 106 (e.g., a sequence of output audio frames or output audio waveform) corresponding to a synthesized speech representation of the same utterance 114 spoken by the target speaker 104. Notably, the S2S conversion model 200 is configured to convert the input audio data 102 directly into the output audio data 106 without performing speech recognition, or otherwise without requiring the generation of any intermediate discrete representations (e.g., text or phonemes) from the input audio data 102.

The S2S conversion model 200 includes an audio encoder 212 configured to encode the input audio data 102 into a hidden feature representation (e.g., a series of vectors), a turn detector 215 configured to determine a breakpoint in the utterance 108 based on the hidden feature representation output by the encoder, and a speech decoder 220 configured to decode the hidden representation into the output audio data 106 corresponding to the synthesized canonical fluent speech representation. For instance, as the audio encoder 200 receives the input audio data 102 of the utterance 108, the audio encoder 200 may process five frames of audio and convert those five frames of audio to ten vectors. The vectors are not a transcription of the frames of audio data 102, but rather a mathematical representation of the frames of the audio data 102. In turn, the turn detector 215 may determine if there is a breakpoint within the ten vectors. If there is a breakpoint, the speech decoder 220 may generate the output audio data 106 corresponding to the synthesized canonical fluent speech representation based on the vectors received from the audio encoder 200 for the vectors prior to the breakpoint. For example, the turn detector 215 may determine that the tenth vector is the breakpoint, so the speech decoder 220 may receive the ten vectors from the audio encoder 200 that represent the five frames of audio. Here, the speech decoder 220 may generate five frames of output audio data 106 corresponding to the synthesized canonical fluent speech representation of the utterance 114 that includes the intended words or parts of words as the five frames of the input audio data 102, but without the disfluencies of the atypical speech.

The S2S conversion system 100 may further include a synthesizer 275 to synthesize the output audio data 106 into a time-domain waveform for audible output as a synthesized utterance 114 of the utterance 108. A time-domain audio waveform includes an audio waveform that defines an amplitude of an audio signal over time. The synthesizer 275 may include a unit selection module or a WaveNet module for synthesizing the output audio data 106 into time-domain waveforms of synthesized canonical fluent speech. In some implementations, the synthesizer 275 includes a vocoder network, i.e., neural vocoder that is separately trained and conditioned on mel-frequency spectrograms for conversion into time-domain audio waveforms. In additional implementations, the synthesizer 275 includes a streaming vocoder configured to convert/invert log magnitude spectrograms output from the speech decoder 220 as the output audio data 106 into time-domain audio waveforms in real-time. An example streaming vocoder is described in U.S. Provisional Application No. 63/312,195, filed on Feb. 21, 2022, the contents of which are incorporated by reference in their entirety.

In some implementations, the target speaker 104 is associated with atypical speech such that the target speaker 104 speaks with an atypical speech pattern that may be difficult to understand. Atypical speech patterns may include, without limitation, impaired speech due to physical or neurological conditions (e.g., speakers with Amyotrophic Lateral Sclerosis (ALS) disease), heavily-accented speech, and deaf speech. In other implementations, the target speaker 104 speaks in a first language and the S2S translates the speech into a second language.

The speech-to-speech conversion system 100 is accordingly trained to convert the input audio data 102 corresponding to utterances 108 spoken by the target speaker 104 associated with atypical speech directly into the output audio data 106 corresponding to the synthesized canonical fluent speech representation of the same utterance 108. Thus, the synthesized canonical fluent speech representation provided by the output audio data 106 improves intelligibility of the atypical speech (e.g., heavily-accented speech or ALS speech) spoken by the targets speaker 104.

Without departing from the scope of the present disclosure, the speech-to-speech conversion system 100 may be trained to convert input audio data 102 corresponding to utterances 108 associated with atypical speech in a first language directly into output audio data 106 corresponding to a synthesized canonical fluent speech representation of the same utterance 108 in the same voice, but in a different second language.

Further, the turn detector 215 may be trained to determine a breakpoint in the input audio data 102 in real time as the utterance 108 spoken by the target speaker 104 is captured in streaming audio by a user device 110 associated with the target speaker 104. In some implementations the turn detector 215 includes a deep neural network. The turn detector 215 may be disposed between the audio encoder 212 and the speech decoder 220 such that the turn detector 215 receives an output 213 from the audio encoder 212 (e.g., a higher order feature representation for each of a sequence of acoustic frames) and transmits a turn output 216 to the decoder 220. The turn output indicates whether the utterance is at a breakpoint. In some implementations, the turn output is a series of bits (e.g., 1s and 0s), where a 1 indicates that the speech is at a breakpoint and a 0 indicates a non-breakpoint. Here, each bit in the series of bit may denote a corresponding acoustic frame of the input audio data 102. In other implementations, the turn output is a probability score (i.e, a number between 0 and 1) indicating the likelihood of a breakpoint at the corresponding acoustic frame. For instance, when the probability score for a corresponding acoustic frame satisfies a breakpoint threshold, then the acoustic frame is indicative of the breakpoint. When the turn output 216 indicates that the speech is at a breakpoint, the S2S model 212 may provide an instruction 117 to the user device 110 that causes the user device 110 to output a turn indication 115 indicating that the use should stop speaking.

The speech decoder 220 may then receive the output 213 from the encoder 212 and the turn output 216 from the turn detector 215 during each of a plurality of time steps. In some implementations, the turn detector 215 modifies the output from the encoder such that the output from the encoder indicates the breakpoint.

The user device (interchangeably referred to as 'computing device') 110 associated with the target speaker 104 may capture the utterance 108 spoken by the target speaker 104 in streaming audio and transmit the corresponding input audio data 102 to the speech-to-speech conversion system 100 for conversion into the output audio data 106. Thereafter, the speech-to-speech conversion system 100 may transmit the output audio data 106 corresponding to the synthesized speech representation of the same utterance 114 spoken by the target speaker 104 to another computing device 116 associated with user 118, whereby the other computing device 116 audibly outputs the synthesized speech representation of the utterance 108 spoken by the target speaker 104. In this example, the target speaker 104 and the user 118 are speaking with each other through their respective computing devices 110, 116, such as over a telephone call or other type of voice communication protocol, for example, voice over internet protocol. While the target speaker 104 and the other user 118 may speak the same language, it may be difficult for the other user 118 to understand the target speaker 104 because the target speaker 104 has atypical speech due to ALS disease. Thus, while the target speaker 104 speaks with atypical speech (e.g., ALS speech) that may be difficult to understand, the other user 118 hearing the synthesized canonical fluent speech representation will have an easier time understanding the utterance 108 intended by the target speaker 104. Stated differently, the synthesized canonical fluent speech representation provides a more consistent cadence that may be easier for another user to understand than the original utterance 108 spoken by the target speaker with the atypical speech. Notably, the synthesized canonical fluent speech representation is in the voice of the target speaker 104.

In some other examples, the S2S conversion system 100 instead passes the output audio data 106 corresponding to the synthesized speech representation of the utterance spoken by the target speaker 104 to an output audio device for audibly outputting the synthesized speech representation in the voice of the target speaker 104 to an audience. For instance, the target speaker 104 may be a psychology professor providing a lecture to a class of students, in which utterances spoken by the target speaker 104 include medical terminology belonging to a particular specific domain, e.g., psychology. As will become apparent, the S2S conversion system 100 is trained to learn linguistic diversity from linguistic content present in training utterances as well acoustic diversity associated with particular types of atypical speech associated with speakers that spoke the target utterances.

Alternatively, the other computing device 116 may be associated with down-stream automated speech recognition (ASR) system in which the speech-to-speech conversion system 100 functions as a front-end to provide the output audio data 106 corresponding to the synthesized speech representation as an input to the ASR system for conversion into recognized text. The recognized text could be presented to the other user 118 and/or could be provided to a natural language understanding (NLU) system for further processing.

In any of the above examples, while the target speaker 104 is speaking, if the turn detector 215 determines that the speech has reached a breakpoint, the S2S model 200 may provide the instruction 117 to cause the user device 110 associated with the target speaker 104 to output the turn indication 115. For example, the user device 110 of FIG. 1 shows the user device 110 displaying a graphical turn indication 115*a* as a series of exclamation marks that informs the target speaker 104 to pause and allow the S2S model 200 to generate the output audio data 106 corresponding to the synthesized canonical fluent speech representation of the input audio data 102. In additional examples, the user device 110 outputs an audible turn indication 115*b* (e.g., emitting a tone or series of tones) that informs the target speaker 104 to pause. The user device 110 may output other types of turn indications 115, such as by vibrating and/or flashing a light, to inform the target speaker 104 to pause from speaking. In some implementations, the S2S model 200 provides the instruction 117 to cause another device (not shown) associated with the target speaker 104 to output the turn indication 115*t*. In these implementations, a device other than the user device 110 that captured the utterance 108 may receive the instruction 117 and output the turn indication 115. For instance, a smart watch worn by the user may output the turn indication 115 by vibrating/beeping to inform the target speaker 104 to pause. Once the instruction 117 is provided to cause the user device 110 (or another device) to output the turn indication 115, the synthesizer 275 may provide a time-domain audio waveform of synthesized speech 114 for output from the device 110, 116 or any other device.

The functionality of the speech-to-speech conversion system 100 can reside on a remote server 112, on either or both of the computing devices 110, 116, or any combination of the remote server and computing devices 110, 116. The computing devices 110 and 116 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system.

Figure 2:
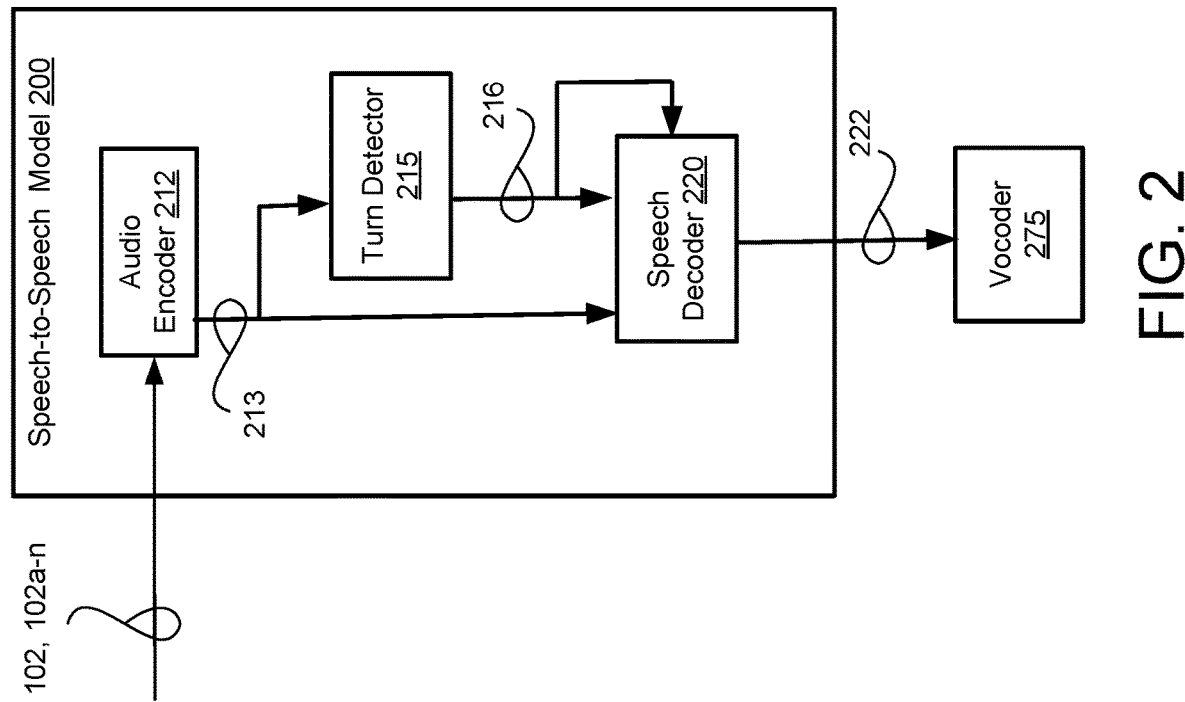
FIG. 2 is a schematic view of an example speech-to-speech model with a turn detector.

FIG. 2 illustrates an example of the speech-to-speech model 200 of FIG. 1 including the encoder 212, the turn detector 215, and the decoder 220. The S2S model 200 processes the input audio signal 102 corresponding to the utterances 108 spoken by the target speaker 104 (FIG. 1) to generate the a sequence of output audio frames 222 corresponding to synthesized speech. The encoder 212 may receive the input audio data 102 of the utterance 108 and generate a higher order feature representation 213 (also referred to herein as hidden feature representation) for each frame 203 in a sequence of audio frames 203 of the audio data 102. Each higher order feature representation 213 is generated by the encoder 212 at an output step corresponding to the frame 203 in the sequence of audio frames. The turn detector 215 may receive the higher order feature representation 213 generated by the encoder 212 at each corresponding output step in order to generate the turn output 216 as a single bit. That is, the turn detector 215 outputs a turn output 216 for each corresponding output step that indicates whether or not the corresponding audio frame 203 is at a breakpoint. Here, the turn detector 215 may correspond a deep neural model including an attention with a logistic function to predict a single bit (0 or 1) based on the encoder output 213 at each output step. In some implementations, the turn output 216 includes a probability distribution indicating a likelihood that the encoder output 212 at each output step is at a breakpoint. The turn detector 215 may analyze each higher order feature representation 213 individually to determine the turn output 216 for the corresponding higher order feature representation 213. In some implementations, the encoder 212 processes the audio data 102 at an attention mechanism to obtain one or more higher order features representations 213 (which may be transmitted as a single vector) which the turn detector 215 can use to generate the turn output 216. Thus, the turn detector 215 may determine whether the utterance 108 is at the breakpoint based on the current higher order feature representation 213 (i.e., the current output step) and one or more higher order feature representations 213 that were generated by the encoder at a preceding output step (i.e., the turn detector 215 receives a history of encoder states in order to predict if the utterance 108 is currently at a breakpoint).

The turn detector 215 may be disposed between the encoder 212 and the decoder 220. Alternatively, the turn detector 215 may be a part of the encoder 212. In either case, the turn detector 215 may provide the decoder 220 with the turn output 216 along with the higher order feature representations 213 output by the encoder 212 at each corresponding output step so that the decoder 220 can generate a sequence of output audio frames 222. The decoder 220 may process the sequence of higher order feature representations 213 received at each output step prior to, and including, and output step corresponding to a breakpoint to generate a sequence of output audio frames 222, where each output audio frame in the sequence of output audio frames 222 is based on a corresponding one of the higher order feature representations 213 generated by the audio encoder 212.

In some implementations, the decoder 220 does not begin to generate the sequence of output audio frames 222 until receiving a turn output 216 corresponding to a breakpoint. In other implementations, the decoder 220 operates in a streaming mode by generating a corresponding output audio frame 222 for each higher order feature representation 213 generated by the encoder 212. Here, the synthesizer 275 may not begin to synthesize the sequence of output audio frames 212 until the turn detector 215 determines that the utterance 108 is at a break point (i.e., the synthesizer begins to synthesize the output audio data 222 at the output step corresponding to a turn output 216 indicating a breakpoint).

In some implementations, the S2S model 200 includes multiple decoders 220 and selects an appropriate decoder 220 based on a speech type of the utterance 108. In these implementations, the S2S model first determines the speech type and then select the appropriate decoder 220. The S2S model 200 may determine a speech type in a variety of ways. In one implementation, the S2S model 200 receives an utterance 108 and determines a speech type based on characteristics of the utterance 108 (e.g., the speech may be accented, delayed, stuttered, dysarthric, etc.). In other implementations, the S2S model 200 receives a speech type from a user profile associated with the target speaker 104 (e.g., the user profile indicates that the user has dysarthric speech). In still other implementations, the S2S model 200 can receive an indication via a user input indicating a speech type (e.g., a user input to translate speech into a particular language).

Based on the speech type, the S2S model 200 may then select an appropriate decoder 220 to use in generating the sequence of output audio frames 222. For example, if the S2S model 200 receives speech corresponding to the speech type of accented speech, the S2S model 200 may select a streaming decoder 220. Here, a streaming decoder 220 may be suited for synthesizing accented speech into non-accented speech as each word in the accented speech is directly synthesized into non-accented speech. However, if the speech type is translation, a streaming decoder 220 may not be appropriate as there may be syntactical differences between languages and an entire sentence or phrase may be necessary for a correct translation. For example, in Turkish "Benimle gitti" literally translates to "me with he went" in English, though a proper translation of that phrase in English would be "he went with me." Thus, for a speech type associated with translation, the S2S model 200 may select a standard decoder 220 that processes an entire sentences. A standard decoder 220 may synthesize speech at each received breakpoint.

Figure 3:
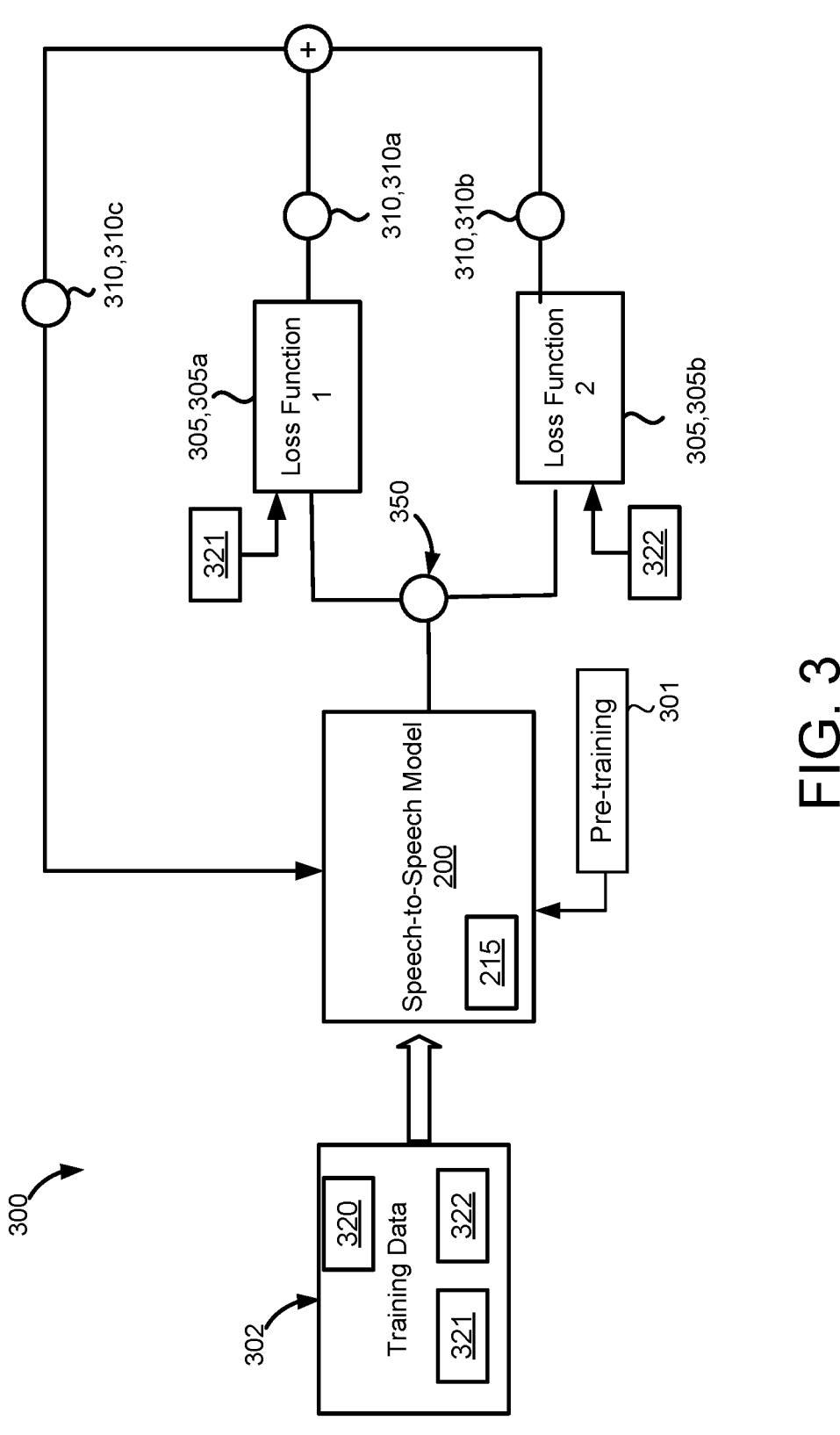
FIG. 3 is a schematic view of an example training process for a speech-to-speech model with a turn detector.

FIG. 3 illustrates a training process 300 for a speech-to-speech model 200 including a turn detector 215. In some implementations, the S2S model 200 is initialized/pre-trained before being further fine-tuned through training. For example, pre-training may include initiating the S2S model 200 with pre-training data 301 including a plurality of spoken utterances by typical speakers associated with canonical fluent speech. Pre-training data 301 may further include the spoken utterances paired with corresponding ground-truth synthesized canonical fluent speech representations of the spoken utterances. In some implementations, the pre-training data 301 includes a respective breakpoint or breakpoints for each utterance of the plurality of utterances. The pre-trained S2S model may then be trained on data 302 from users with atypical speech to further fine-tune the S2S model 200 for users with atypical speech. In another example, the S2S model 200 is preconfigured with general parameters and then be fine-tuned throughout the training process 300.

The training process 300 may include training any of the audio encoder 212, the turn detector 215, or the speech decoder 220 separately or jointly in any suitable combination. The process 300 includes feeding training data 302 to the S2S model 200. In some implementations, the training data 302 includes training input audio data 320 associated with a plurality of training atypical speech samples spoken by one or more speakers associated with atypical speech. That is, for each training atypical speech sample, the training input audio data 320 may include a corresponding training sequence of acoustic frames. In these implementations, the training data 302 also includes training output audio data 321 associated with a plurality of ground-truth canonical speech samples each paired with a corresponding one of the training atypical speech samples. Here, each ground-truth canonical speech sample of the training output audio data 321 may include a sequence of acoustic frames of that corresponds to a canonical fluent speech representation of the same utterance as the training input audio data 320. Further, the training data 302 may also include a sequence of breakpoint labels 322 for each of the plurality of training atypical speech samples of the input audio data 320 that include a series of bits labeled as 1s and 0s to indicate whether or not a corresponding acoustic frame of the input audio data 320 is at a breakpoint. For example, the training data 302 can include training input audio data 320 corresponding to a training atypical speech sample for an utterance spoken by a user with atypical speech, training output audio data 321 that corresponds to a canonical fluent speech representation of the same utterance as the training input audio data 320, and label 321 may indicate which acoustic frame in the training input audio data 320 includes a breakpoint of the utterance (e.g., each period in the transcription of the utterance). Notably, the label 321 may additionally correspond to a ground-truth transcription of the training input audio data 320 that indicates where the breakpoint occurs.

Further, training data 302 may be based on user interactions with outputs of a trained S2S model 200. In this manner, the S2S model 200 can be recurrently fine-tuned based on real-world feedback. For example, an S2S model 200 may receive streaming speech from a user. When the S2S model 200 determines that the speech has reached a breakpoint, the S2S model 200 provides the instruction 117 to cause the user device to output the turn indication 115 that informs the user to stop speaking. However, if the user overrides the turn indication 115 by continuing to speak or other means, then the determined breakpoint may be considered incorrect. Here, the user's utterance may be used as training data, where the point that the user stopped speaking is used as the label 322 corresponding to the target breakpoint.

Upon receiving the training data 302, the S2S model 200 may generate an output 350 (e.g., a sequence of output audio frames 222, a time-domain audio waveform of synthesized speech representing the utterance spoken by the user, and/or a turn output 216). The S2S model 200 may process the training data 302 in the manner described with respect to FIG. 2, above, or any other suitable manner for speech-to-speech conversion.

In some implementations, the output 350 is used by one or more loss functions 305, 305*a-b* to generate one or more losses 310, 310*a-c*. That is, the loss function 305*a* compares the output 350 to the corresponding ground-truth canonical speech sample of the training output audio data 321 to generate the loss 310*a*, where the loss 310*a* indicates a discrepancy between the predicted output 350 and the corresponding ground-truth canonical speech sample of the training output audio data 321. For example, the loss function 305*a* may compare an output 350 (i.e., a sequence of predicted output audio frames 222) of the S2S model 200 to training output audio data 321 that includes a sequence of ground-truth output audio frames representing the canonical fluent speech representation of the training input audio data 120 determine a loss 310*a*.

Further, the loss function 305*b* compares the output 350 to the breakpoint labels 322 to generate the loss 310*b*, where the loss 310*b* indicates a discrepancy between the breakpoint label 322 and a location of a predicted breakpoint in the output 350. For example, the loss function 305*b* may compare an output (i.e., turn output 216) by the S2S model 200 to the breakpoint label 322 corresponding to a target breakpoint of the training data 302 to determine a loss 310*b*. In some implementations, the turn output 216 may be a bit (i.e., 0 or 1) generated by the turn detector 215 of the S2S model 200 based on the higher order feature representation corresponding to each frame of the sequence of acoustic frames of the utterance, where a '0' correspond to a non-breakpoint and a '1' corresponds to a breakpoint. Alternatively, the turn output 216 may be a probability distribution. In some implementations, the losses 310 may be combined to form loss 310*c*. Alternatively, the losses 310 may be sent to S2S model 200 individually.

The loss functions 305 may implement any suitable technique to determine a loss 310 such as regression loss, mean squared error, mean squared logarithmic error, mean absolute error, binary classification, binary cross entropy, hinge loss, multi-class loss, etc. The losses 310 may then be fed directly to the S2S model 200. The S2S model 200 may then process the loss and adjusts one or more parameters to account for the loss.

FIG. 4 is a flowchart of an exemplary arrangement of operations for a method 400 of a speech-to-speech model 200 with a turn detector 215. Data processing hardware 510 (FIG. 5) may perform the operations for the method 400 by executing instructions stored on memory hardware 520

(FIG. 5) in communication with the data processing hardware 510. The data processing hardware 510 and the memory hardware 520 may reside on a computing device 500 (FIG. 5), such as the remote server 112 and/or the user computing device 110 of FIG. 1.

At operation 402, the method 400 includes receiving, as input to a speech-to-speech (S2S) model 200, a sequence of acoustic frames 102 corresponding to an utterance 108 spoken by a user 104 in streaming audio captured by a client device 110 associated with the user 104. At each of a plurality of output steps, operation 404 of method 400 includes generating, by an audio encoder 212 of the S2S model 200, a higher order feature representation 213 for a corresponding acoustic frame 102 in the sequence of acoustic frames 102. At each of a plurality of output steps, operation 406 of method 400 includes determining, by a turn detector 215 of the S2S model 200, based on the higher order feature representation 213 generated by the audio encoder 212 at the corresponding output step, whether the utterance 108 is at a breakpoint at the corresponding output step. At operation 408, the method includes, when the turn detector 215 determines utterance is at the breakpoint, synthesizing a sequence of output audio frames 222 output by a speech decoder 220 of the S2S model 200 into a time-domain audio waveform of synthesized speech representing the utterance 108 spoken by the user 104. Here, each output audio frame 222 in the sequence of output audio frames 222 corresponds to the output audio data 106 and is based on a corresponding one of the higher order feature representations 213 generated by the audio encoder 212 until the corresponding output step when the turn detector 215 determines the utterance is at the breakpoint.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
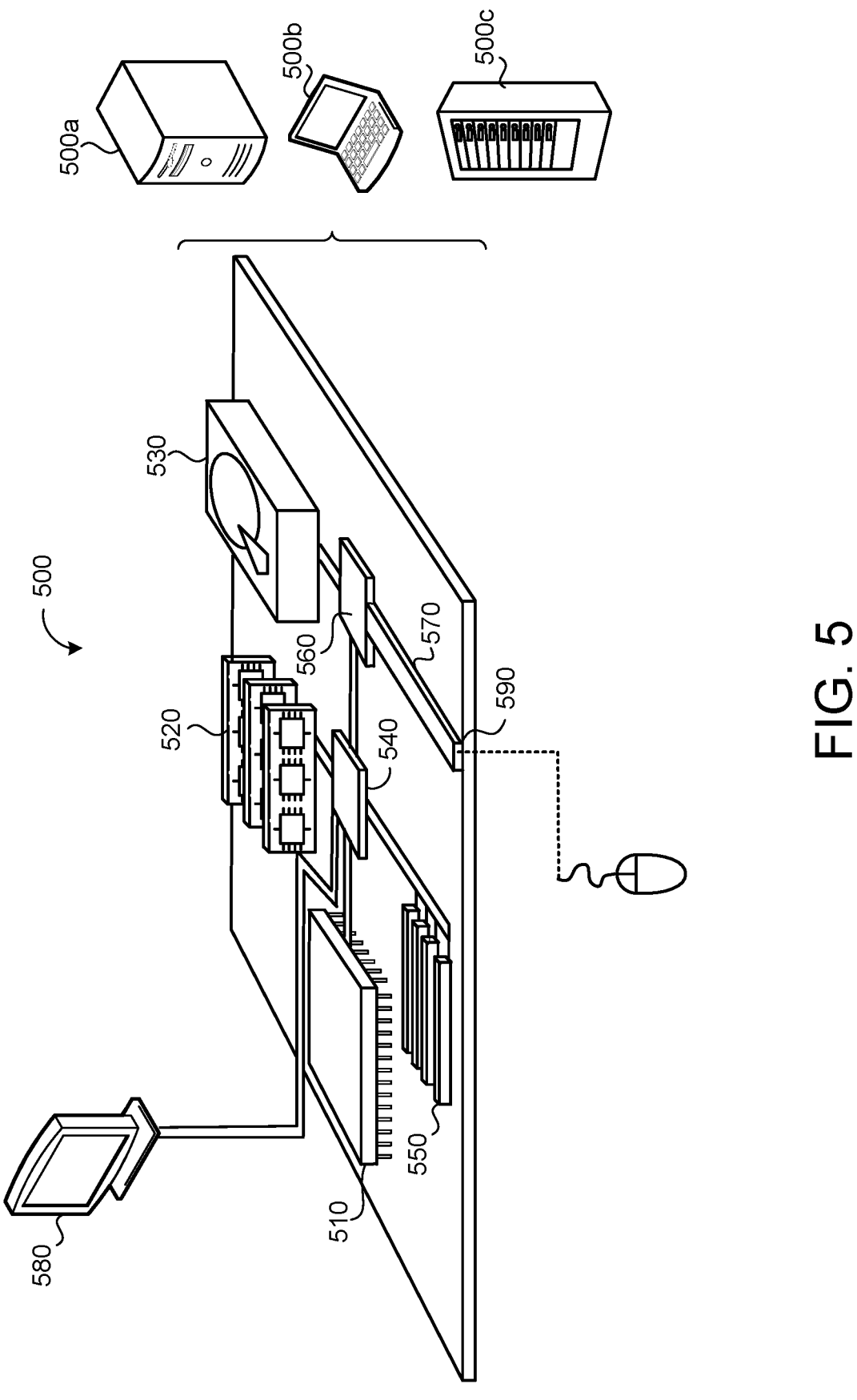
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving, as input to a speech-to-speech (S2S) model, a sequence of acoustic frames corresponding to an utterance spoken by a user in streaming audio captured by a client device associated with the user, wherein the S2S model is configured to convert input acoustic frames directly into output acoustic frames corresponding to synthesized speech without performing speech recognition on the input acoustic frames; and at each of a plurality of output steps:

generating, by an audio encoder of the S2S model, a higher order feature representation for a corresponding acoustic frame in the sequence of acoustic frames;

determining, by a turn detector of the S2S model, based on the higher order feature representation generated by the audio encoder at the corresponding output step, whether the utterance is at a breakpoint at the corresponding output step; and when the turn detector determines that the utterance is at the breakpoint, synthesizing a sequence of output audio frames output by a speech decoder of the S2S model into a time-domain audio waveform of synthesized speech representing the utterance spoken by the user, each output audio frame in the sequence of output audio frames based on a corresponding one of the higher order feature representations generated by the audio encoder until the corresponding output step when the turn detector determines the utterance is at the breakpoint, wherein the turn detector is disposed between the audio encoder and a speech decoder of the S2S model, and wherein determining whether the utterance is at the breakpoint comprises:

receiving, by the turn detector from the audio encoder, the higher order feature representation at the corresponding output step; and generating, by the turn detector, a turn output indicative of whether the utterance is at the breakpoint based on the higher order feature representation at the corresponding output step.

2. The computer-implemented method of claim 1, wherein the operations further comprise, when the utterance is at the breakpoint, providing for output from the client device:

a speaker turn indication that informs the user to stop speaking; and the time-domain audio waveform of synthesized speech representing the utterance spoken by the user.

3. The computer-implemented method of claim 1, wherein:

the utterance spoken by the user in the streaming audio captured by the client device is associated with atypical speech; and the time-domain audio waveform of synthesized speech representing the utterance comprises a time-domain audio waveform of synthesized canonical fluent speech of the same utterance spoken by the user.

4. The computer-implemented method of claim 1, wherein:

the utterance spoken by the user in the streaming audio captured by the client device is in a first language; and the time-domain audio waveform of synthesized speech representing the utterance comprises a time-domain audio waveform of synthesized translated speech of the same utterance in a second language different than the first language.

5. The computer-implemented method of claim 1, wherein determining whether the utterance is at the breakpoint at the corresponding output step is further based on one or more of the higher order feature representations generated by the audio encoder at output steps preceding the corresponding output step.

6. The computer-implemented method of claim 1, wherein the operations further comprise, at each of the plurality of output steps, generating, by the speech decoder of the S2S model, an output audio frame for a corresponding higher order feature representation generated by the audio encoder at the corresponding output step.

7. The computer-implemented method of claim 1, wherein the operations further comprise, in response to determining that the utterance is at the breakpoint at the corresponding output step:

receiving, as input to the speech decoder of the S2S model, a sequence of the higher order feature representations generated by the audio encoder until the corresponding output step; and generating, by the speech decoder of the S2S model, the sequence of output audio frames.

8. The computer-implemented method of claim 1, wherein the turn detector comprises a deep neural network.

9. The computer-implemented method of claim 1, wherein the turn detector is disposed between the audio encoder and the speech decoder.

10. The computer-implemented method of claim 1, wherein determining whether the utterance is at the breakpoint at the corresponding output step comprises generating, as output from the turn detector, a turn output indicative of whether the utterance is at the breakpoint.

11. The computer-implemented method of claim 10, wherein the turn output comprises a bit.

12. The computer-implemented method of claim 10, wherein the turn output comprises a probability distribution.

13. The computer-implemented method of claim 1, wherein the operations further comprise training the S2S model by:

receiving a set of training utterances, each training utterance in the set of training utterances:

comprising a corresponding sequence of training acoustic frames, each training acoustic frame in the sequence of training acoustic annotated with a label indicating whether the corresponding training acoustic frame corresponds to a breakpoint frame or a non-breakpoint frame; and paired with a corresponding ground-truth synthesized speech representation of the training utterance;

obtaining a first label for the training input audio data indicative of a target output spectrogram;

obtaining a second label for the training input audio data indicative of a target turn output;

generating, using the speech conversion model and the training input audio data, a training output comprising:

a training output spectrogram corresponding to a synthesized speech representation of the training input audio data; and a training turn output indicative of a breakpoint in the training input audio data;

determining a first loss by comparing the training output spectrogram to the first label;

determining a second loss by comparing the training turn output to the second label; and optimizing the S2S model based on the first loss and the second loss associated with the training input audio data.

14. The computer-implemented method of claim 1, wherein the operations further comprise:

determining a speech type of the utterance spoken by the user captured in the streaming audio by the client device; and selecting, from among a plurality of available speech decoders, the speech decoder for generating the sequence of output audio frames.

15. The computer-implemented method of claim 1, wherein the each output audio frame in the sequence of output audio frames output by the speech decoder comprises a spectrogram frame.

16. A system comprising:

data processing hardware; and memory hardware storing instructions that when executed on data processing hardware causes the data processing hardware to perform operations comprising:

receiving, as input to a speech-to-speech (S2S) model, a sequence of acoustic frames corresponding to an utterance spoken by a user in streaming audio captured by a client device associated with the user, wherein the S2S model is configured to convert input acoustic frames directly into output acoustic frames corresponding to synthesized speech without performing speech recognition on the input acoustic frames; and at each of a plurality of output steps:

generating, by an audio encoder of the S2S model, a higher order feature representation for a corresponding acoustic frame in the sequence of acoustic frames;

determining, by a turn detector of the S2S model, based on the higher order feature representation generated by the audio encoder at the corresponding output step, whether the utterance is at a breakpoint at the corresponding output step; and when the turn detector determines that the utterance is at the breakpoint, synthesizing a sequence of output audio frames output by a speech decoder of the S2S model into a time-domain audio waveform of synthesized speech representing the utterance spoken by the user, each output audio frame in the sequence of output audio frames based on a corresponding one of the higher order feature representations generated by the audio encoder until the corresponding output step when the turn detector determines the utterance is at the breakpoint, wherein the turn detector is disposed between the audio encoder and a speech decoder of the S2S model, and wherein determining whether the utterance is at the breakpoint comprises:

receiving, by the turn detector from the audio encoder, the higher order feature representation at the corresponding output step; and generating, by the turn detector, a turn output indicative of whether the utterance is at the breakpoint based on the higher order feature representation at the corresponding output step.

17. The system of claim 16, wherein the operations further comprise, when the utterance is at the breakpoint, providing for output from the client device:

a speaker turn indication that informs the user to stop speaking; and the time-domain audio waveform of synthesized speech representing the utterance spoken by the user.

18. The system of claim 16, wherein:

the utterance spoken by the user in the streaming audio captured by the client device is associated with atypical speech; and the time-domain audio waveform of synthesized speech representing the utterance comprises a time-domain audio waveform of synthesized canonical fluent speech of the same utterance spoken by the user.

19. The system of claim 16, wherein:

the utterance spoken by the user in the streaming audio captured by the client device is in a first language; and the time-domain audio waveform of synthesized speech representing the utterance comprises a time-domain audio waveform of synthesized translated speech of the same utterance in a second language different than the first language.

20. The system of claim 16, wherein determining whether the utterance is at the breakpoint at the corresponding output step is further based on one or more of the higher order feature representations generated by the audio encoder at output steps preceding the corresponding output step.

21. The system of claim 16, wherein the operations further comprise, at each of the plurality of output steps, generating, by the speech decoder of the S2S model, an output audio frame for a corresponding higher order feature representation generated by the audio encoder at the corresponding output step.

22. The system of claim 16, wherein the operations further comprise, in response to determining that the utterance is at the breakpoint at the corresponding output step:

receiving, as input to the speech decoder of the S2S model, a sequence of the higher order feature representations generated by the audio encoder until the corresponding output step; and generating, by the speech decoder of the S2S model, the sequence of output audio frames.

23. The system of claim 16, wherein the turn detector comprises a deep neural network.

24. The system of claim 16, wherein the turn detector is disposed between the audio encoder and the speech decoder.

25. The system of claim 16, wherein determining whether the utterance is at the breakpoint at the corresponding output step comprises generating, as output from the turn detector, a turn output indicative of whether the utterance is at the breakpoint.

26. The system of claim 25, wherein the turn output comprises a bit.

27. The system of claim 25, wherein the turn output comprises a probability distribution.

28. The system of claim 16, wherein the operations further comprise training the S2S model by:

receiving a set of training utterances, each training utterance in the set of training utterances:

comprising a corresponding sequence of training acoustic frames, each training acoustic frame in the sequence of training acoustic annotated with a label indicating whether the corresponding training acoustic frame corresponds to a breakpoint frame or a non-breakpoint frame; and paired with a corresponding ground-truth synthesized speech representation of the training utterance;

obtaining a first label for the training input audio data indicative of a target output spectrogram;

obtaining a second label for the training input audio data indicative of a target turn output;

generating, using the speech conversion model and the training input audio data, a training output comprising:

a training output spectrogram corresponding to a synthesized speech representation of the training input audio data; and a training turn output indicative of a breakpoint in the training input audio data;

determining a first loss by comparing the training output spectrogram to the first label;

determining a second loss by comparing the training turn output to the second label; and optimizing the S2S model based on the first loss and the second loss associated with the training input audio data model based on the first loss and the second loss associated with the training input audio data.

29. The system of claim 16, wherein the operations further comprise:

determining a speech type of the utterance spoken by the user captured in the streaming audio by the client device; and selecting, from among a plurality of available speech decoders, the speech decoder for generating the sequence of output audio frames.

30. The system of claim 16, wherein the each output audio frame in the sequence of output audio frames output by the speech decoder comprises a spectrogram frame.

* * * * *